US 10,987,910 B2
Apr. 27, 2021

(12) United States Patent
Gupta et al.

(54) FOAM AS ADHESIVE FOR COMPOSITES FOR THERMAL INSULATION

(71) Applicant: BASF SE, Ludwigshafen am Rhein (DE)

(72) Inventors: Anoop Gupta, Trostberg (DE); Sarunas Turcinskas, Trostberg (DE); Gerhard Albrecht, Prien a. Chiemsee (DE); Eva Guenther, Trostberg (DE); Samuel Weiss, Trostberg (DE); Michael Kutschera, Ludwigshafen am Rhein (DE); Lutz Schaefer, Bensheim (DE)

(73) Assignee: BASF SE, Ludwigshafen (DE)

( * ) Notice: Subject to any disclaimer, the term of this patent is extended or adjusted under 35 U.S.C. 154(b) by 137 days.

(21) Appl. No.: 15/747,460

(22) PCT Filed: Jul. 6, 2016

(86) PCT No.: PCT/EP2016/065937
§ 371 (c)(1),
(2) Date: Jan. 25, 2018

(87) PCT Pub. No.: WO2017/016831
PCT Pub. Date: Feb. 2, 2017

(65) Prior Publication Data
US 2018/0370211 A1  Dec. 27, 2018

(30) Foreign Application Priority Data

Jul. 27, 2015 (EP) .................................. 15178488
Jul. 31, 2015 (EP) .................................. 15179246

(51) Int. Cl.
| | | |
|---|---|---|
| *B32B 37/12* | (2006.01) | |
| *B32B 15/00* | (2006.01) | |
| *B32B 15/04* | (2006.01) | |
| *B32B 5/02* | (2006.01) | |
| *B32B 7/00* | (2019.01) | |
| *B32B 9/04* | (2006.01) | |

(Continued)

(52) U.S. Cl.
CPC ............... *B32B 37/12* (2013.01); *B32B 5/00* (2013.01); *B32B 5/02* (2013.01); *B32B 5/022* (2013.01); *B32B 5/18* (2013.01); *B32B 5/26* (2013.01); *B32B 7/00* (2013.01); *B32B 7/02* (2013.01); *B32B 7/04* (2013.01); *B32B 7/12* (2013.01); *B32B 9/00* (2013.01); *B32B 9/04* (2013.01); *B32B 15/00* (2013.01); *B32B 15/04* (2013.01); *B32B 15/08* (2013.01); *B32B 19/00* (2013.01); *B32B 19/04* (2013.01); *B32B 27/00* (2013.01); *B32B 27/06* (2013.01); *B32B 27/08* (2013.01); *B32B 27/12* (2013.01); *B32B 27/18* (2013.01); *B32B 27/20* (2013.01); *B32B 27/28* (2013.01); *B32B 2250/40* (2013.01); *B32B 2262/00* (2013.01); *B32B 2262/02* (2013.01); *B32B 2262/0246* (2013.01); *B32B 2262/0253* (2013.01); *B32B 2262/0261* (2013.01); *B32B 2262/0276* (2013.01); *B32B 2262/10* (2013.01); *B32B 2262/101* (2013.01); *B32B 2262/103* (2013.01); *B32B 2262/105* (2013.01); *B32B 2262/108* (2013.01); *B32B 2266/00* (2013.01); *B32B 2266/04* (2013.01); *B32B 2266/102* (2016.11); *B32B 2266/14* (2016.11); *B32B 2307/30* (2013.01); *B32B 2307/304* (2013.01); *B32B 2419/00* (2013.01)

(58) Field of Classification Search
CPC .............. B32B 37/12; B32B 5/00; B32B 5/02
See application file for complete search history.

(56) References Cited

U.S. PATENT DOCUMENTS

| | | |
|---|---|---|
| 5,124,364 A | 6/1992 | Wolff et al. |
| 5,137,927 A | 8/1992 | Wolff et al. |

(Continued)

FOREIGN PATENT DOCUMENTS

| | | |
|---|---|---|
| CN | 202866178 U | 4/2013 |
| CN | 103696532 A | 4/2014 |

(Continued)

OTHER PUBLICATIONS

International Search Report dated Aug. 26, 2016 in PCT/EP2016/065937 filed Jul. 6, 2016, 4 pages.

(Continued)

*Primary Examiner* — Chinessa T. Golden
(74) *Attorney, Agent, or Firm* — Grüneberg and Myers PLLC

(57) ABSTRACT

The present invention relates to a process for the preparation of a composite for thermal insulation comprising at least layers (L1), (L2) and (LB), the process comprising the steps of providing layer (L1) containing from 25 to 95% by weight of aerogel and from 5 to 75% by weight of fibers and from 0 to 70% by weight of fillers and layer (L2) containing from 25 to 95% by weight of aerogel and from 5 to 75% by weight of fibers and from 0 to 70% by weight of fillers; applying a composition (C1) comprising an inorganic binder on one surface of the layer (L1) or layer (L2) or layer (L1) and (L2), and combining layer (L1) and layer (L2) in a manner that composition (C1) is located between layer (L1) and (L2), wherein composition (C1) is applied in the form of a, as well as a composite for thermal insulation comprising at least layers (L1), (L2) and layer (LB) which is located between layers (L1) and (L2) and the use of said composite for thermal insulation.

22 Claims, No Drawings

(51) Int. Cl.

| | |
|---|---|
| *B32B 7/02* | (2019.01) |
| *B32B 9/00* | (2006.01) |
| *B32B 5/00* | (2006.01) |
| *B32B 27/08* | (2006.01) |
| *B32B 27/28* | (2006.01) |
| *B32B 7/04* | (2019.01) |
| *B32B 19/04* | (2006.01) |
| *B32B 27/00* | (2006.01) |
| *B32B 5/18* | (2006.01) |
| *B32B 19/00* | (2006.01) |
| *B32B 5/26* | (2006.01) |
| *B32B 15/08* | (2006.01) |
| *B32B 27/18* | (2006.01) |
| *B32B 27/06* | (2006.01) |
| *B32B 27/12* | (2006.01) |
| *B32B 27/20* | (2006.01) |
| *B32B 7/12* | (2006.01) |

(56) References Cited

U.S. PATENT DOCUMENTS

| | | |
|---|---|---|
| 5,656,195 A | 8/1997 | Mielke et al. |
| 5,738,801 A | 4/1998 | Ziegler et al. |
| 6,080,475 A | 6/2000 | Frank et al. |
| 2002/0094426 A1 | 7/2002 | Stepanian et al. |
| 2004/0077738 A1* | 4/2004 | Field ...................... E04F 13/00 521/50 |
| 2006/0263587 A1 | 11/2006 | Ou et al. |
| 2013/0196137 A1* | 8/2013 | Evans ...................... B32B 19/06 428/292.1 |
| 2014/0245929 A1 | 9/2014 | Gartner et al. |
| 2014/0318069 A1 | 10/2014 | Moennig et al. |
| 2016/0244366 A1 | 8/2016 | Turcinskas et al. |

FOREIGN PATENT DOCUMENTS

| | | |
|---|---|---|
| EP | 0 396 076 A1 | 11/1990 |
| GB | 2507325 A | 4/2014 |
| JP | 8-34678 A | 2/1996 |
| WO | WO 95/06617 A1 | 3/1995 |
| WO | WO 96/15997 A1 | 5/1996 |
| WO | WO 2010/046074 A1 | 4/2010 |
| WO | WO 2012/098040 A1 | 7/2012 |
| WO | WO 2015/062860 A1 | 5/2015 |

OTHER PUBLICATIONS

International Preliminary Report on Patentability and Written Opinion of the International Searching Authority dated Feb. 8, 2018 in PCT/EP2016/065937 filed Jul. 6, 2016, 7 pages.

Hüsing, N., et al., "Aerogels", Ullmann's Encyclopedia of Industrial Chemistry, Sixth Edition, 2000 Electronic Release, 2000, vol. 1, 621-646 with cover page.

Ayen, R.J., et al., "Metal Oxide Aerogel Preparation by Supercritical Extraction", Reviews in Chemical Engineering. vol. 5 No. 1-4, 1988, pp. 157-198 with cover page.

* cited by examiner

FOAM AS ADHESIVE FOR COMPOSITES FOR THERMAL INSULATION

The present invention relates to a process for the preparation of a composite for thermal insulation comprising at least layers (L1), (L2) and (LB), the process comprising the steps of providing layer (L1) containing from 25 to 95% by weight of aerogel and from 5 to 75% by weight of fibers and from 0 to 70% by weight of fillers and layer (L2) containing from 25 to 95% by weight of aerogel and from 5 to 75% by weight of fibers and from 0 to 70% by weight of fillers; applying a composition (C1) comprising an inorganic binder on one surface of the layer (L1) or layer (L2) or layer (L1) and (L2), and combining layer (L1) and layer (L2) in a manner that composition (C1) is located between layer (L1) and (L2), wherein composition (C1) is applied in the form of a foam, as well as a composite for thermal insulation comprising at least layers (L1), (L2) and layer (LB) which is located between layers (L1) and (L2) and the use of said composite for thermal insulation.

In times of high energy costs, the thermal insulation both of new buildings and in the renovation of old buildings is accorded ever greater importance. For this purpose, composite thermal insulation systems are preferably applied to walls, floor or ceilings of heated buildings in order to reduce heat losses by transmission from the interior of the building. Such composite thermal insulation systems comprise an insulation layer, preferably in the form of boards, which are usually adhesively bonded to the building. Layers of render are applied to the insulation layer in order to protect the insulation layer against weathering influences. It is usual to apply a base render which is reinforced with a woven fabric layer and is covered by a layer of covering render. Both render layers together are applied in thicknesses of from about 2 to about 7 mm, preferably less than 3 mm, when synthetic resin renders are used, while mineral render systems can reach thicknesses in the range from about 8 mm to about 20 mm.

Many insulation materials have been used in the past for the insulation layer of a composite thermal insulation system. In particular, polymeric foams, e.g. foams based on polyurethanes or polystyrene, mineral wool, glass fibers and also natural materials such as hemp, cork or perlites are used as insulation materials. However, conventional exterior wall insulation systems meet the desired requirements for the thermal insulation values only when appropriately thick layers of the respective material are used. Such massive buildups on the exterior walls, however, often spoil the overall aesthetic impression of the building and are therefore undesirable. Furthermore, such massive buildups mean that windows and doors have to be displaced and less light can shine into the interior rooms, which leads to a significant impairment of the quality of living. It is known that hydrogels, e.g. silica hydrogels, which can be produced by precipitation of gel from water glass, can be dried under supercritical conditions to form microporous, three-dimensionally crosslinked silicon dioxide particles. Under the conditions of the supercritical drying, the surface tension of the fluid present in the microporous, three-dimensionally crosslinked particles is completely or largely eliminated. The objective here is to avoid shrinkage of the microporous three-dimensionally crosslinked particles to a significant extent during drying, since characteristic properties of the microporous, three-dimensionally crosslinked particles are entirely or partly lost on shrinkage. Such a product obtained by supercritical drying is, in the case of gels, referred to as an aerogel. Unlike conventional drying without special precautions, in which the gels experience a large volume contraction and form xerogels, only a small volume contraction (less than 15% by volume) thus takes place during drying in the vicinity of the critical point.

Aerogels, in particular those based on silicates, are already being used in composite thermal insulation systems because of their very good insulating properties and have the advantage that they lead to a significantly lower buildup of the wall at a given insulation performance. A typical value for the thermal conductivity of silicate aerogels in air at atmospheric pressure is in the range from 0.017 to 0.021 W/(m-K). The differences in the thermal conductivity of the silicate aerogels are essentially determined by the different size of the pores resulting from the production process, which is in the range from 10 to 100 nm.

The prior art for the production of aerogels by means of supercritical drying is comprehensively described in, for example, Reviews in Chemical Engineering, Volume 5, Nos. 1-4, pp. 157-198 (1988), in which the pioneering work of Kistler is also described.

WO 95/06617 A relates to hydrophobic silica aerogels which can be obtained by reacting a water glass solution with an acid at a pH of from 7.5 to 11, removing most of the ionic constituents from the hydrogel formed by washing with water or dilute aqueous solutions of inorganic bases while maintaining the pH of the hydrogel in the range from 7.5 to 11, displacing the aqueous phase present in the hydrogel by an alcohol and subsequently drying the resulting alcogel under supercritical conditions.

The production of insulation boards from pulverulent aerogels and organic or inorganic binders and optionally further aggregates is known. For example, WO 96/6015997 describes a composite material which comprises from 10 to 95% by weight of aerogel particles and at least one inorganic binder. However, such boards have the disadvantage that relatively large amounts of binders have to be used to obtain a stable board. However, this leads to the thermal insulation properties being significantly worsened compared to the aerogels; thermal conductivities of 0.15 W/(m-K) are reported in the examples.

Owing to a high degree of hydrophobicization, commercially available silicate aerogel powders have a high organic content. The hydrophobicization is necessary to be able to dry aerogels subcritically after they have been produced, without formation of xerogels occurring, i.e. severe shrinkage and thus a loss of the good thermal insulation properties (see "Aerogels", N. Husing, U. Schubert, Ullmann's Encyclopedia of Industrial Chemistry, Sixth Edition, 2000 Electronic Release, Wiley-VCH, Weinheim 2000). The organic component introduced into the aerogels by the high level of hydrophobicization is problematical in terms of the burning behavior. Commercially available silicate aerogel powders, for example Nanogel® from Cabot, are classified according to DIN 4102-1 into the burning class B1 (not readily flammable). However, for high-rise buildings up to a height of 100 meters, non-flammable systems (at least a burning class A2) are required.

Composite aerogel mats reinforced with fibers are at present being marketed commercially under the trade name Spaceloft® by Aspen Aerogel Inc. Thus, for example, US 2002/0094426 describes a composite aerogel mat and its use. However, such mats are available only in low thicknesses (about 1 cm) because of the production process and the necessity of supercritical drying. Production by supercritical drying has the advantage that the aerogel has to be hydrophobicized to a lesser extent, which is advantageous in terms of the burning behavior. However, these mats have the disadvantage that they have to be applied in a number of layers in order to achieve a satisfactory insulation performance. Here, each layer has to be fastened individually to the wall by means of insulation fasteners, which is labor intensive and expensive and can also lead to heat bridges. Furthermore, the fibers used in the commercially available composite aerogel mats generally comprise organic polymers and are thus problematical in terms of the burning behavior.

Furthermore, WO 2010/046074 discloses a composite thermal insulation system for insulating a wall of a building, which system comprises a first thermal insulation board containing from 20 to 90% by weight of aerogel and a second thermal insulation board which contains mineral wool. In an alternative embodiment, the system can also comprise at least one composite board which contains mineral wool and from 20 to 90% by weight of aerogels.

WO 2012/098040 A discloses a process of manufacturing aerogel panels by gluing the single aerogel blankets by using alkali silicates in water (water glass). The production process includes cutting of aerogel blankets, adding adhesive on the surface (e.g. by spraying), apply certain pressure to the multilayered panel and then dry the panels in oven. The problem is that the mechanical performance of panels obtained by this process is inferior due to the fact that the bonding performance is low. Especially under shear and tensile stresses, the boards are delaminated in the adhesive layer (adhesion failure). This is because the surface of the blankets is hydrophobic, contains aerogel dust and is uneven. This result in non-sufficient wetting of the hydrophilic water glass on the blanket and uneven distribution of the adhesive that is enriched in grooved parts of the surfaces or even flows out of the blanket while applying pressure.

It was therefore an object of the present invention to provide a composite thermal insulation system for example for the thermal insulation of an exterior wall of a building, which system has a very low thermal conductivity and thus achieves very good insulation performance even at low layer thicknesses. The composite for thermal insulation should have such a structure that it is very easy to work by the user and can thus be matched on the building site to the circumstances of the building. At the same time, the composite for thermal insulation should have a high flexural strength and ideally be flat in order to achieve a very high long-term mechanical stability of the composite thermal insulation system. It was a further object of the present invention to provide a process for preparing said composites.

According to the present invention, this object is solved by a process for the preparation of a composite for thermal insulation comprising at least layers (L1), (L2) and (LB), the process comprising the steps of
(i) providing
  (ia) layer (L1) containing from 25 to 95% by weight of aerogel and from 5 to 75% by weight of fibers and from 0 to 70% by weight of fillers and
  (ib) layer (L2) containing from 25 to 95% by weight of aerogel and from 5 to 75% by weight of fibers and from 0 to 70% by weight of fillers;
(ii) applying a composition (C1) comprising an inorganic binder on one surface of the layer (L1) or layer (L2) or layer (L1) and (L2);
(iii) combining layer (L1) and layer (L2) in a manner that composition (C1) is located between layer (L1) and (L2),
wherein composition (C1) is applied in the form of a foam.

Furthermore, the present invention relates to a composite for thermal insulation comprising at least layers (L1), (L2) and layer (LB), wherein the layer (LB) is located between layers (L1) and (L2), and wherein
  the layer (L1) contains from 25 to 95% by weight of aerogel and from 5 to 75% by weight of fibers and from 0 to 70% by weight of fillers,
  the layer (L2) contains from 25 to 95% by weight of aerogel and from 5 to 75% by weight of fibers and from 0 to 70% by weight of fillers, and
  the layer (LB) comprises at least one inorganic binder, has a density of less than 2700 kg/m$^3$ and optionally comprises pores.

Layer (LB) is a binder layer located between layers (L1) and (L2).

It has surprisingly been found that the composite thermal insulation system of the invention has a high long-term mechanical stability. Furthermore, it was surprising that the structure according to the invention makes it possible to obtain a composite thermal insulation system which is non-combustible (caloric value of less than 3 MJ per kg). Furthermore, it has been found that foaming the composition (C1), i.e. applying the composition (C1) comprising the inorganic binder in the form of a foam, leads to a homogeneous distribution of adhesive on the respective layer, for example the aerogel blankets. In addition viscosity and also hydrophobic/hydrophilic balance of the inorganic binder is changed thus enabling better wetting behavior. All this results in increased mechanical properties, e.g. improved tensile strength.

According to the present invention, a composite for thermal insulation is prepared by a process comprising at least steps (i) to (iii). According to step (i), layers (L1) and (L2) are provided, wherein layer (L1) contains from 25 to 95% by weight of aerogel and from 5 to 75% by weight of fibers and from 0 to 70% by weight of fillers and layer (L2) containing from 25 to 95% by weight of aerogel and from 5 to 75% by weight of fibers and from 0 to 70% by weight of fillers. According to the present invention, the composition of layers (L1) and (L2) can be identical or can differ. According to step (ii) of the process according to the present invention, a composition (C1) comprising an inorganic binder is applied on one surface of the layer (L1) or layer (L2) or layer (L1) and (L2). According to step (iii), layer (L1) and layer (L2) are combined in a manner that composition (C1) is located between layer (L1) and (L2). Composition (C1) is applied in the form of a foam.

According to the present invention, in step (ii), the composition (C1) is applied comprising an inorganic binder. In principle, any suitable composition can be used as long it is suitable to form a stable foam that remains stable until it is applied on the respective surface. According to the present invention, the foam can be formed in any suitable manner known to the person skilled in the art, for example mechanically, physically or chemically.

According to a further embodiment, the present invention relates to a process for the preparation of a composite for thermal insulation as disclosed above, wherein the foam is formed mechanically or physically. According to another embodiment, the present invention relates to a process for the preparation of a composite for thermal insulation as disclosed above, wherein the foam is formed chemically.

Mechanically forming the foam can for example be carried out by stirring, ultrasonic foaming or by introducing mechanical energy by other suitable means. In the context of the present invention mechanically forming the foam also covers forming a foam by blowing a gas through the composition. Suitable gases include nitrogen, carbon dioxide, oxygen, hydrogen, noble gases such as helium or argon or low hydrocarbons or mixtures of these gases. According to the present invention, it is also possible to use pressurized gas such as nitrogen, carbon dioxide, oxygen, hydrogen, noble gases such as helium or argon or low hydrocarbons for forming the foam.

Chemically forming the foam can be carried out using any suitable agent known to the person skilled in the art which releases a suitable gas. However, the foam can also be formed by using a foaming agent, for example by using hydrogen peroxide or nitrogen containing compounds as foaming agents or for example pentane. A suitable source for gas might also be the reaction of metals such as aluminum or magnesium in alkaline aqueous medium. Suitable foaming agents are mentioned in WO 2015/062860.

According to the present invention, the composition (C1) is applied on one surface of the layer (L1) or layer (L2) or layer (L1) and (L2). Composition (C1) might also be partially applied to the respective surface as long as the amount of the composition (C1) is sufficient to ensure a binding effect between the layers (L1) and (L2).

According to the present invention, the process can also comprise further steps. In particular, further layers can be applied which preferably are also attached using a binder composition.

In a preferred embodiment, the at least two-layer composite for thermal insulation is a board which is prefabricated and is joined to the other constituents on the building site to form a composite thermal insulation system. The composite for thermal insulation preferably has a thickness of from 250 mm to 10 mm, in particular from 100 mm to 20 mm and particularly preferably from 80 mm to 30 mm. The dimensions of the board can vary within wide ranges and the board preferably has a height of from 2000 to 200 mm and a width of from 1200 mm to 200 mm.

Preferably, aerogels having a low degree of hydrophobicization and thus a low gross heat of combustion are used.

According to the present invention, layer (L1) and (L2) each contain from 25 to 95% by weight of aerogel. In principle, any suitable aerogel known to the person skilled in the art might be used in the context of the present invention. Suitable aerogels are for example aerogels based on silicon, aluminium and/or titanium. Thus, according to a further embodiment, the present invention relates to a process for the preparation of a composite for thermal insulation as disclosed above, wherein the aerogel is at least one aerogel based on silicon, aluminium and/or titanium.

For the mechanical stability of the composite, it is essential for the purposes of the invention for the layers to contain fibers.

According to the present invention, layer (L1) and (L2) each contain from 5 to 75% by weight of fibers. According to the present invention, any suitable fibers can be used such as organic fibers or inorganic fibers. According to a further embodiment, the present invention relates to a process for the preparation of a composite for thermal insulation as disclosed above, wherein the fibers are selected from inorganic fibers and organic fibers.

In the case of inorganic fibers, these can be, in a preferred embodiment, glass fibers, rock fibers, metal fibers, boron fibers, ceramic fibers and/or basalt fibers, in particular glass fibers. Thus, according to a further embodiment, the present invention relates to a process for the preparation of a composite for thermal insulation as disclosed above, wherein the fibers are inorganic fibers selected from the group consisting of glass fibers, rock fibers, metal fibers, boron fibers, ceramic fibers and/or basalt fibers.

Particularly suitable organic fibers are fibers based on polyethylene, polypropylene, polyacrylonitrile, polyamide, aramid or polyester. When adding the organic fibers, preference is given to the amount of organic fibers being selected so that the gross heat of combustion of the composite thermal insulation system is less than 3 MJ per kilogram.

According to a further embodiment, the present invention relates to a process for the preparation of a composite for thermal insulation as disclosed above, wherein the fibers are organic fibers selected from the group consisting of fibers based on polyethylene, polypropylene, polyacrylonitrile, polyamide, aramid or polyester.

In a preferred embodiment, the composite thermal insulation system more particularly comprises <1% by weight of organic fibers and preferably no organic fibers. According to the present invention, the layer (L1) and/or the layer (L2) may also contain a mixture of fibers, for example inorganic fibers and organic fibers.

Furthermore, the layer (L1) and/or the layer (L2) can comprise a filler. In the context of the present invention, the filler can be an organic filler or an inorganic filler or a mixture of two or more fillers. Suitable fillers are known to the person skilled in the art. Preferably, inorganic fillers are used. Therefore, according to a further embodiment, the present invention relates to a process for the preparation of a composite for thermal insulation as disclosed above, wherein the filler is an inorganic filler.

Therefore, the present invention is also directed to a process for the preparation of a composite for thermal insulation comprising at least layers (L1), (L2) and (LB), the process comprising the steps of
(i) providing
(ia) layer (L1) containing from 25 to 95% by weight of aerogel and from 5 to 75% by weight of fibers and from 0 to 70% by weight of inorganic fillers and
(ib) layer (L2) containing from 25 to 95% by weight of aerogel and from 5 to 75% by weight of fibers and from 0 to 70% by weight of inorganic fillers;
(ii) applying a composition (C1) comprising an inorganic binder on one surface of the layer (L1) or layer (L2) or layer (L1) and (L2);
(iii) combining layer (L1) and layer (L2) in a manner that composition (C1) is located between layer (L1) and (L2),
wherein composition (C1) is applied in the form of a foam.

Furthermore, the present invention relates to a composite for thermal insulation comprising at least layers (L1), (L2) and layer (LB), wherein the layer (LB) is located between layers (L1) and (L2), and wherein
the layer (L1) contains from 25 to 95% by weight of aerogel and from 5 to 75% by weight of fibers and from 0 to 70% by weight of inorganic fillers,
the layer (L2) contains from 25 to 95% by weight of aerogel and from 5 to 75% by weight of fibers and from 0 to 70% by weight of inorganic fillers, and
the layer (LB) comprises at least one inorganic binder, has a density of less than 2700 $kg/m^3$ and optionally comprises pores.

According to one embodiment, the composite for thermal insulation can contain inorganic fillers. These can be, for example, magnesium dioxide, titanium dioxide, titanium carbide, silicon carbide, iron(III) oxide, iron(II) oxide, zirconium silicate, zirconium oxide, tin oxide, manganese oxide, calcium silicate, calcium carbonate or mixtures thereof, in particular magnesium dioxide or titanium dioxide.

According to a further embodiment, the present invention relates to a process for the preparation of a composite for thermal insulation as disclosed above, wherein the filler is an inorganic filler selected from magnesium dioxide, titanium dioxide, titanium carbide, silicon carbide, iron(III) oxide, iron(II) oxide, zirconium silicate, zirconium oxide, tin oxide, manganese oxide, calcium silicate, calcium carbonate or a mixture thereof.

In the context of the present invention, the composition (C1) can also comprise further components such as surfactants and/or additives, in particular lightweight additives e.g. aerogel, pyrogenic silica, hollow spheres to improve the quality of the foam. The composition (C1) may also comprise fibers, for example inorganic or organic fibers as mentioned above.

The inorganic binder for coating the composite for thermal insulation is in particular a hydraulic binder, preferably cement, in particular portland cement. According to a preferred embodiment, alkali-activated aluminosilicates are used as binders. These are mineral materials which are formed by reaction of at least two components. The first component is one or more hydraulic, reactive solids containing $SiO_2$ and $Al_2O_3$, e.g. fly ash, slag, and/or metakaolin and/or cement. The second component is an alkaline activator, e.g. sodium water glass or sodium hydroxide. In the presence of water, contact of the two components results in curing by formation of an aluminosilicate-containing, amorphous to partially crystalline network, which is water-resistant.

Furthermore, hydraulic lime can also be used as inorganic binder. For coating of the thermal insulation composite, the inorganic binder is preferably mixed with fillers to produce a mortar before application to the board and/or is provided with fillers by application and/or spraying after application to the board. In a further embodiment, the inorganic binder comprises polymers, in particular polar polymers and redispersed polymer powders, preferably homopolymers or copolymers composed of vinyl acetate, styrene, butadiene, ethylene, vinyl esters of Versatic acid and/or urea-formaldehyde condensation products and/or melamine-formaldehyde condensation products. Furthermore, the composition (C1) can contain thickeners, water retention agents, dispersants, rheology improvers, antifoams, retarders, accelerators, additives, pigments and organic or inorganic fibers.

According to a further embodiment, the present invention therefore relates to a process for the preparation of a composite for thermal insulation as disclosed above, wherein the composition (C1) comprises at least one further component selected from the group consisting of surfactants, organic and/or inorganic fibers, dispersions, infrared reflectors and/or absorbers, accelerators, retarders, thickeners, water retention agents, dispersants, rheology modifiers, antifoams, aerogel, pyrogenic silica, hollow spheres and/or fillers.

According to a further embodiment, the present invention relates to a process for the preparation of a composite for thermal insulation as disclosed above, wherein the inorganic binder is at least one component selected from the group consisting of alkali silicate, cement and alkali-activated aluminosilicates, in particular consisting of potassium water glass, sodium water glass, cement and alkali-activated aluminosilicates.

The composition (C1) can include a surfactant. Surfactants are compounds having a hydrophilic head and a hydrophobic tail. The foam might be stabilized by adding an alkali stable surfactant. The composition (C1) might also comprise mixtures of surfactants.

According to a further embodiment, the present invention relates to a process for the preparation of a composite for thermal insulation as disclosed above, wherein composition (C1) comprises at least one surfactant and/or Pickering stabilizers.

In the context of the present invention it is also possible to use a precursor of a surfactant, i.e. a compound which only reacts as a surfactant under certain conditions such as a suitable pH or a certain temperature. Suitable compounds are for example mentioned in US 2014/0245929 A1.

For one or more embodiments the surfactant can be selected from the group consisting of non-ionic surfactants, cationic surfactants, anionic surfactants, amphoteric surfactants, and combinations thereof. The surfactant may be employed in various amounts for differing applications. For example, the surfactant can be employed in an amount having a value that is from 0.10 weight percent to 5.00 weight percent of composition (C1), preferably in the range of from 0.25 to 2.5 weight percent, more preferably in the range of from 0.5 to 1.5 weight percent.

Examples of non-ionic surfactants include, but are not limited to, alkyl polysaccharides, amine oxides, block copolymers, castor oil ethoxylates, ceto-oleyl alcohol ethoxylates, ceto-stearyl alcohol, ethoxylates, decyl alcohol ethoxylates, dinonyl phenol ethoxylates, dodecyl, phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, mono-branched alcohol ethoxylates, natural alcohol ethoxylates, nonyl phenol ethoxylates, octyl phenol ethoxylates, oleyl amine ethoxylates, random copolymer alkoxylates, sorbitan ester ethoxylates, stearic acid ethoxylates, stearyl amine ethoxylates, synthetic alcohol ethoxylates, tall oil fatty acid ethoxylates, tallow amine, ethoxylates, trid tridecanol ethoxylates, and combinations thereof.

Examples of cationic surfactants include, but are not limited to, alkyl dimethylamines, alkyl amidopropylarnines, alkyl imidazoline derivatives, quaternised amine ethoxylates, quaternary ammonium compounds, and combinations thereof.

Examples of anionic surfactants include, but are not limited to, alkyl ether phosphates, alkyl ether carboxylic acids and salts, alkyl ether sulphates, alkyl naphthalene sulphonates, alkyl phosphates, alkyl benzene sulphonic acids and salts, alkyl phenol ether phosphates, alkyl phenol ether sulphates, alpha olefin sulphonates, aromatic hydrocarbon sulphonic acids, salts and blends, condensed naphthalene sulphonates, di-alkyl sulphosuccinates, fatty alcohol sulphates, mono-alkyl sulphosuccinates, alkyl sulphosuccinamates, naphthalene sulphonates, and combinations thereof.

Amphoteric surfactants can be anionic (negatively charged), cationic (positively charged) or non-ionic (no charge) in solution, depending on the pH of the water. Examples of amphoteric surfactants include, but are not limited to, alkyl ampho(di)acetates, amido betaines, alkyl betaines, and combinations thereof.

According to the present invention, the density of the foam can vary in broad ranges. Preferably, the composition (C1) has a density of less than 1250 kg/m³, for example in the range of from 30 to 1250 kg/m³, more preferably a density of less than 400 kg/m³, for example in the range of from 70 to 400 kg/m³.

In order to produce aerogel panels and/or shapes, inorganic adhesives with the aforementioned surfactant/wetting agent are applied at a level between 10 and 500 grams (dry coat weight) per square meter, preferably between 50 and 350 grams per square meter, more preferably between 100 and 200 grams per square meter. Any and all of the inorganic adhesives can be diluted with water to provide for improved foam stability.

Sodium or potassium silicate based adhesives can affect bonding by two distinct methods: (1) chemical polymerization or (2) evaporation of water/dehydration. Evaporation of residual water content in the aqueous-based adhesive can be conducted using common heating methods such as convection, radiative or dielectric heating. It is preferable to initially treat wet panels and/or shapes at a temperature of not more than 95° C. Initial exposure of wetted panels/shapes above 95° C. resulted in diminished bond strengths due to the blistering and foaming of the silicate bond formed via the rapid/flash evaporation of water. After removing a minimum of 80% of the water from the inorganic adhesive at temperatures below 95° C., it is possible and preferable to subsequently heat treat the bonded panel at temperatures between 95 and 370° C., more preferably between 150 and 200° C. Accelerated cure times can be achieved with all inorganic aqueous based adhesives using microwave curing techniques. Flat panel or board-type insulation for horizontal, vertical or slanted surfaces may be prepared by the methods and structures of the present invention.

After the overall size of the insulation system is determined, a fiber-reinforced aerogel material is cut to this particular length and width (assuming that it is rectangular in shape, although it could be any shape to match the geometry of the building section that is to be insulated). Next, a certain amount of inorganic or mostly inorganic binder is applied to one or both sides of each insulation layer, not including the exterior facing layers (i.e., the side facing the building and the side facing away from the building). The covering weight for this inorganic adhesive can be between 1.0 to 750 g/m$^2$. This insulation system may comprise a minimum of two layers of aerogel blanket. The maximum layers are limited only by the handling considerations. Typically, 2 or more layers of aerogel blanket may be combined using the described approach.

The inorganic binder by means of which the layers of the composite for thermal insulation are joined preferably has a layer thickness before being pressed between the blankets in the range from 0.05 to 1 cm, in particular from 0.1 to 0.6 cm and preferably from 0.15 to 0.4 cm. This can be mixed with fillers to form a mortar before application to the board and/or be provided with fillers by application and/or spraying after installation. In a further embodiment, the inorganic binder comprises polymers, in particular polar polymers and redispersible polymer powders, preferably homopolymers or copolymers composed of vinyl acetate, styrene, butadiene, ethylene, vinyl esters of Versatic acid and/or urea-formaldehyde condensation products, silicone and silicate resins and/or melamine-formaldehyde condensation products. Furthermore, the binder can contain thickeners, water retention agents, dispersants, rheology improvers, anti-foams, retardants, accelerators, additives, pigments and organic or inorganic fibers.

Joining of the at least two layers of the composite for thermal insulation by means of an inorganic binder has the advantage that a very good mechanical bond between the layers is achieved. Furthermore, a high flexural strength of the composite for thermal insulation is achieved. The at least two-layer composite for thermal insulation is preferably a board, so that this can be more easily transported to the site of use and processed there. Overall, significant use properties of the composite for thermal insulation are improved in this way. In a preferred embodiment, the inorganic binder by means of which the layers of the composite for thermal insulation are joined is at least one component selected from the group consisting of potassium water glass, sodium water glass, cement, in particular portland cement, and alkali-activated aluminosilicates, preferably potassium water glass. A number of inorganic binders or adhesives may be employed to produce bonded panels and/or shapes. Such binders may be water based or based on other solvents. The water-based adhesives range from pure sodium silicate with various silica to sodium oxide ratios, to commercially available silicate based mixtures containing various inorganic fillers.

Once the layers of aerogel have been coated with the composition (C1), each layer is stacked upon one another and the edges are aligned such that all of the layers create one geometric shape with smooth edges (such as rectangle, in this case). It is possible to trim the edges of said insulation element in post-production, after the inorganic binder has cooled/cured and either before or after the coating material and/or exterior covering material is applied. Weights may optionally be applied over the surface of the adhered layers to ensure that the insulation system layers are bonded tightly together, but they are not necessary. According to the present invention, preferably pressure is applied after stacking the layers and the volume of the foam layer is compressed. The volume might be compressed to about 50% of the initial thickness of the layer, preferably to 60 to 99% of the initial thickness, in particular to 75% to 98% of the initial thickness, more preferable to 85 to 95% of the initial thickness of the layer. The flat panel type insulation system is then cured either at room temperature (allowing the solvent, usually water, in the inorganic binder to evaporate) or is accelerated by placing in an oven at 30 to 115° C. The temperature and duration of curing may be varied depending on the number of aerogel layers, amount and solids content of the inorganic binder and the geometry and/or shape of the aerogel system. The resulting composite comprises layers (L1) and (L2) and a binder layer (LB).

Once the inorganic binder is completely cured, it creates a semi-rigid, high-flexural strength board-type insulation element that is multiple layers of aerogel thick. At this time, a covering/coating material may be applied. This coating is in a preferred embodiment polymeric in nature and applied via spray, dip, gravure roll, meyer roll, knife-over-roll, knife-over-web, curtain, roll or extrusion coated. Initially, this coating material was applied via roll coating.

According to the present invention, the layer (L1) or (L2) can be further treated before the composition (C1) is applied. Preferably, the surface of the respective layer is treated in order to improve the adhesion of the composition (C1). A preferred treatment is for example a reduction of dust on the surface or an increase of the roughness of the surface in order to improve the stability of the composite obtained. Suitable methods of treatment also include but are not limited to plasma treatment of the surface and surface coating.

According to a further embodiment, the present invention relates to a process for the preparation of a composite for thermal insulation as disclosed above, wherein the treatment is selected from plasma treatment of the surface, surface coating, removal of dust from the surface, and partially pulling out of embedded fibers from the surface.

The process can, in particular, be carried out continuously and/or in an automated manner. It has been found that the process allows very wide variation in respect of the thickness of the thermal insulation composite. As a result of the optionally simultaneous coating of the composite for thermal insulation on both sides, the composite is stabilized particularly well and warping of the composite for thermal insulation is prevented. Joining of the layers of the composite for thermal insulation can be carried out under pressure using all methods known for this purpose to a person skilled in the art. In particular, the composite for thermal insulation can be pressed between two contrarotating rollers. The surface of the rollers can be smooth. However, it can also be advantageous for the rollers to have a surface structure and the structure to be embossed on the surface of the composite for thermal insulation after joining of the layers. The adhesion on fastening to the surface of a building and the adhesion of the render can be improved in this way. It is also particularly advantageous for the side facing the building and/or the side facing away from the building of the composite for thermal insulation to be coated with an organic or inorganic binder after joining.

In a preferred embodiment, when the composite for thermal insulation is coated with any inorganic binder, a binder accelerator is brought into contact with the inorganic binder before and/or after application of the inorganic binder. Here, the accelerator is preferably brought into contact with the binder, preferably by spraying, shortly before application to the thermal insulation composite. However, it is also possible for the accelerator to be incorporated beforehand into the inorganic binder. In a further preferred embodiment, the accelerator is applied only after the binder layer has been applied to the thermal insulation composite. This can once again preferably be effected by spraying. The accelerator can be, for example, a sulphate, nitrate, nitrite, formate, aluminate, silicate or hydroxide or a mixture thereof. Particular preference is given to aluminium salts such as aluminium sulphate and aluminium hydroxide, which are particularly preferably used as aqueous solutions.

The use of an accelerator has the advantage that the composite for thermal insulation has a high strength after a very short time. If the composite for thermal insulation is in the form of boards and a woven mesh and/or a woven fabric or nonwoven layer are applied, the thermal insulation boards can also be stacked immediately after production even without use of an accelerator. Hydraulic binders in particular in this way acquire optimal conditions during further curing since premature loss of water does not occur. Drying of the boards in an oven is not necessary in this case. This process according to the invention thus conserves resources particularly well and also leads to a significant cost reduction and improved stiffness of the board, based on the amount of inorganic binder used. It is also possible for the composite for thermal insulation of the invention to comprise further layers; in particular, these layers can comprise glass fibers or rock wool. In a particular embodiment, the composite thermal insulation system of the invention has less than 4, in particular less than 2 and particularly preferably no, mechanical fastening points per square meter for joining to the wall of the building.

The composite for thermal insulation is preferably fastened to the exterior wall of the building by adhesive bonding. A mineral adhesive and reinforcing composition, in particular a composition based on white hydrated lime and cement, is, for example, suitable for this purpose. Furthermore, it is also possible to use an adhesive composition based on synthetic resin. In a preferred embodiment, from 1 to 50% by weight, in particular from 2 to 40% by weight, particularly preferably from 3 to 30% by weight and more preferably from 4 to 20% by weight, of aerogel, in particular silicate aerogel in powder form, is mixed into the adhesive. In this way, the layer thickness of the total composite thermal insulation system can be reduced further while maintaining the same heat transmission coefficient. Suitable renders for the composite thermal insulation system of the invention are, in particular, mineral renders or decorative renders based on silicone resin. In a preferred embodiment, from 1 to 50% by weight, in particular from 2 to 40% by weight, particularly preferably from 3 to 30% by weight and more preferably from 4 to 20% by weight, of aerogel, in particular silicate aerogel in powder form, are mixed into the render. The thickness of the total composite thermal insulation system can be reduced further in this way at a given heat transmission coefficient.

According to the present invention, a composite for thermal insulation comprising at least two layers (L1) and (L2) and a binder layer (LB) is obtained. The layer (LB) comprises inorganic binders selected from the group consisting of alkali silicate, such as for example potassium and/or sodium water glass, cement and alkali-activated aluminosilicates. The layer (LB) also comprises further components included in the composition (C1) which have not reacted during the curing process.

The density of the layer (LB) depends on the composition (C1) and the preparation process of the composite. Preferably, the density of the layer (LB) is less than 2700 kg/m$^3$, for example in the range of from 50 to 2650 kg/m$^3$, more preferably the density of the layer (LB) is less than 1300 kg/m$^3$, for example in the range of from 80 to 1250 kg/m$^3$.

Furthermore, the layer (LB) optionally comprises pores. The pores might be open cell or closed cell pores. The layer (LB) may also comprise open cell and closed cell pores. The pore size might vary in broad ranges and also the size distribution of the pores might vary.

According to a further aspect, the present invention relates to a composite for thermal insulation comprising at least layers (L1) and (L2) and layer (LB), obtained or obtainable by a process as disclosed above.

According to a further aspect, the present invention also relates to a composite for thermal insulation comprising at least layers (L1), (L2) and layer (LB), wherein the layer (LB) is located between layers (L1) and (L2), and wherein
- the layer (L1) contains from 25 to 95% by weight of aerogel and from 5 to 75% by weight of fibers and from 0 to 70% by weight of fillers,
- the layer (L2) contains from 25 to 95% by weight of aerogel and from 5 to 75% by weight of fibers and from 0 to 70% by weight of fillers, and
- the layer (LB) comprises at least one inorganic binder, has a density of less than 2700 kg/m$^3$ and optionally comprises pores.

With respect to preferred embodiments, reference is made to the above disclosure regarding preferred embodiments of the respective layers and compositions.

According to a further aspect, the present invention relates to the use of a composite as disclosed above for thermal insulation.

In a preferred embodiment, the composite for thermal insulation is coated on the side facing the building and/or the side facing away from the building, preferably on the side facing the building and the side facing away from the building, with a polymeric material, in particular an acrylate coating, silicone-containing coating, phenol-containing coating, vinyl acetate coating, ethylene-vinyl acetate coating, styrene acrylate coating, styrene-butadiene coating, polyvinyl alcohol coating, polyvinyl chloride coating, acrylamide coating or mixtures thereof, with the coatings also being able to contain crosslinkers.

In a particularly preferred embodiment, the composite for thermal insulation is coated on the side facing the building and/or the side facing away from the building, preferably on the side facing the building and the side facing away from the building, with an inorganic binder. It is advantageous here for the coating to lead to a particularly torsion-resistant composite for thermal insulation and thus to a particularly high long-term mechanical stability of the composite thermal insulation system. In this context, it is particularly advantageous for the composite for thermal insulation to be joined on the side facing the building and/or the side facing away from the building in the outward direction in the following order by at least a woven mesh and thereon at least a woven fabric or nonwoven layer, where the layers are joined by means of an inorganic binder. In a preferred embodiment, the composite for thermal insulation is coated on the side facing the building and on the side facing away from the building in such a way.

To improve the insulation properties further, it is also possible, for the purposes of the invention, to add up to 50% by weight, preferably up to 10% by weight and in particular up to 5% by weight, based on the composite for thermal insulation, of pigments which scatter, absorb or reflect infrared radiation in the wavelength range from 3 to 10 µm. In particular, this can be carbon black, magnesium dioxide, titanium dioxide, titanium carbide, silicon carbide, iron(III) oxide, iron(II) oxide, zirconium silicate, zirconium oxide, tin oxide, manganese oxide, calcium silicate, calcium carbonate or a mixture thereof. In this respect, reference is made to EP 0396076 A1.

The present invention includes the following embodiments, wherein these include the specific combinations of embodiments as indicated by the respective interdependencies defined therein.

1. Process for the preparation of a composite for thermal insulation comprising at least layers (L1), (L2) and (LB), the process comprising the steps of
   (i) providing
   (ia) layer (L1) containing from 25 to 95% by weight of aerogel and from 5 to 75% by weight of fibers and from 0 to 70% by weight of fillers and
   (ib) layer (L2) containing from 25 to 95% by weight of aerogel and from 5 to 75% by weight of fibers and from 0 to 70% by weight of fillers;
   (ii) applying a composition (C1) comprising an inorganic binder on one surface of the layer (L1) or layer (L2) or layer (L1) and (L2);
   (iii) combining layer (L1) and layer (L2) in a manner that composition (C1) is located between layer (L1) and (L2),
   wherein composition (C1) is applied in the form of a foam.
2. The process according to embodiment 1, wherein the composite comprises further layers.
3. The process according to embodiment 1 or 2, wherein the foam is formed mechanically or physically.
4. The process according to embodiment 1 or 2, wherein the foam is formed chemically.
5. The process according to any of embodiments 1 to 4, wherein the aerogel is at least one aerogel based on silicon, aluminium and/or titanium.
6. The process according to any of embodiments 1 to 5, wherein the filler is an inorganic filler.
7. The process according to any of embodiments 1 to 6, wherein the filler is an inorganic filler selected from magnesium dioxide, titanium dioxide, titanium carbide, silicon carbide, iron(III) oxide, iron(II) oxide, zirconium silicate, zirconium oxide, tin oxide, manganese oxide, calcium silicate, calcium carbonate or a mixture thereof.
8. The process according to any of embodiments 1 to 7, wherein the fibers are selected from inorganic fibers and organic fibers.
9. The process according to any of embodiments 1 to 8, wherein the fibers are inorganic fibers selected from the group consisting of glass fibers, rock fibers, metal fibers, boron fibers, ceramic fibers and/or basalt fibers.
10. The process according to any of embodiments 1 to 9, wherein the fibers are organic fibers selected from the group consisting of fibers based on polyethylene, polypropylene, polyacrylonitrile, polyamide, aramid or polyester.
11. The process according to any of embodiments 1 to 10, wherein the composition (C1) comprises at least one further component selected from the group consisting of surfactants, organic and/or inorganic fibers, dispersions, infrared reflectors and/or absorbers, accelerators, retarders, thickeners, water retention agents, dispersants, rheology modifiers, antifoams, aerogel, pyrogenic silica, hollow spheres and/or fillers.
12. The process according to any of embodiments 1 to 11, wherein composition (C1) comprises at least one surfactant and/or Pickering stabilizers.
13. The process according to any of embodiments 1 to 12, wherein the surface on which the composition (C1) is applied is treated before applying composition (C1).
14. The process according to embodiment 13, wherein the treatment is selected from plasma treatment of the surface, surface coating, removal of dust from the surface, and partially pulling out of embedded fibers from the surface.
15. The process according to any of embodiments 1 to 14, wherein the inorganic binder is at least one component selected from the group consisting of alkali silicate, cement and alkali-activated aluminosilicates.
16. A composite for thermal insulation comprising at least layers (L1) and (L2) and layer (LB), obtained or obtainable by a process according to any of embodiments 1 to 15.
17. A composite for thermal insulation comprising at least layers (L1), (L2) and layer (LB), wherein layer (LB) is located between layers (L1) and (L2), and wherein
   the layer (L1) contains from 25 to 95% by weight of aerogel and from 5 to 75% by weight of fibers and from 0 to 70% by weight of fillers,
   the layer (L2) contains from 25 to 95% by weight of aerogel and from 5 to 75% by weight of fibers and from 0 to 70% by weight of fillers, and
   the layer (LB) comprises at least one inorganic binder, has a density of less than 2700 kg/m$^3$ and optionally comprises pores.
18. Use of a composite according to embodiment 16 or embodiment 17 for thermal insulation.
19. The composite according to embodiment 17, wherein the composite comprises further layers.
20. The composite according to embodiment 17 or 19, wherein the aerogel is at least one aerogel based on silicon, aluminium and/or titanium.
21. The composite according to any of embodiments 17, 19 or 20, wherein the filler is an inorganic filler selected from magnesium dioxide, titanium dioxide, titanium carbide, silicon carbide, iron(III) oxide, iron(II) oxide, zirconium silicate, zirconium oxide, tin oxide, manganese oxide, calcium silicate, calcium carbonate or a mixture thereof.
22. The composite according to any of embodiments 17, or 19 to 21, wherein the fibers are selected from inorganic fibers and organic fibers.
23. The composite according to any of embodiments 17, or 9 to 22, wherein the fibers are inorganic fibers selected from the group consisting of glass fibers, rock fibers, metal fibers, boron fibers, ceramic fibers and/or basalt fibers.
24. The composite according to any of embodiments 17, or 19 to 23, wherein the fibers are organic fibers selected from the group consisting of fibers based on polyethylene, polypropylene, polyacrylonitrile, polyamide, aramid or polyester.
25. The composite according to any of embodiments 17, or 19 to 24, wherein the layer (LB) comprises at least one further component selected from the group consisting of surfactants, organic and/or inorganic fibers, infrared reflectors and/or absorbers, accelerators, retarders, thickeners, water retention agents, dispersants, rheology modifiers, antifoams, aerogel, pyrogenic silica, hollow spheres and/or fillers.
26. Process for the preparation of a composite for thermal insulation comprising at least layers (L1), (L2) and a binder layer (LB) located between layers (L1) and (L2), the process comprising the steps of
  (i) providing
    (ia) layer (L1) containing from 25 to 95% by weight of aerogel and from 5 to 75% by weight of fibers and from 0 to 70% by weight of fillers and
    (ib) layer (L2) containing from 25 to 95% by weight of aerogel and from 5 to 75% by weight of fibers and from 0 to 70% by weight of fillers;
  (ii) applying a composition (C1) comprising an inorganic binder on one surface of the layer (L1) or layer (L2) or layer (L1) and (L2);
  (iii) combining layer (L1) and layer (L2) in a manner that composition (C1) is located between layer (L1) and (L2),
wherein composition (C1) is applied in the form of a foam.
27. The process according to embodiment 26, wherein the composite comprises further layers.
28. The process according to embodiment 26 or 27, wherein the foam is formed mechanically or physically.
29. The process according to embodiment 28, wherein mechanically forming the foam is carried out by stirring, ultrasonic foaming, by introducing mechanical energy by other suitable means or by blowing a gas through the composition.
30. The process according to embodiment 26 or 27, wherein the foam is formed chemically.
31. The process according to embodiment 30, wherein chemically forming the foam is carried out using an agent which releases a suitable gas or by using a foaming agent.
32. The process according to any of embodiments 26 to 31, wherein the aerogel is at least one aerogel based on silicon, aluminium and/or titanium.
33. The process according to any of embodiments 26 to 32, wherein the filler is an inorganic filler.
34. The process according to any of embodiments 26 to 33, wherein the filler is an inorganic filler selected from magnesium dioxide, titanium dioxide, titanium carbide, silicon carbide, iron(III) oxide, iron(II) oxide, zirconium silicate, zirconium oxide, tin oxide, manganese oxide, calcium silicate, calcium carbonate or a mixture thereof.
35. The process according to any of embodiments 26 to 34, wherein the fibers are selected from inorganic fibers and organic fibers.
36. The process according to any of embodiments 26 to 35, wherein the fibers are inorganic fibers selected from the group consisting of glass fibers, rock fibers, metal fibers, boron fibers, ceramic fibers and/or basalt fibers.
37. The process according to any of embodiments 26 to 36, wherein the fibers are organic fibers selected from the group consisting of fibers based on polyethylene, polypropylene, polyacrylonitrile, polyamide, aramid or polyester.
38. The process according to any of embodiments 26 to 37, wherein the composition (C1) comprises at least one further component selected from the group consisting of surfactants, organic and/or inorganic fibers, dispersions, infrared reflectors and/or absorbers, accelerators, retarders, thickeners, water retention agents, dispersants, rheology modifiers, antifoams, aerogel, pyrogenic silica, hollow spheres and/or fillers.
39. The process according to any of embodiments 26 to 38, wherein composition (C1) comprises at least one surfactant and/or Pickering stabilizers.
40. The process according to any of embodiments 26 to 39, wherein the surface on which the composition (C1) is applied is treated before applying composition (C1).
41. The process according to embodiment 40, wherein the treatment is selected from plasma treatment of the surface, surface coating, removal of dust from the surface, and partially pulling out of embedded fibers from the surface.
42. The process according to any of embodiments 26 to 41, wherein the inorganic binder is at least one component selected from the group consisting of alkali silicate, cement and alkali-activated aluminosilicates.
43. A composite for thermal insulation comprising at least layers (L1) and (L2) and layer (LB), obtained or obtainable by a process according to any of embodiments 26 to 42.
44. A composite for thermal insulation comprising at least layers (L1), (L2) and layer (LB), wherein layer (LB) is located between layers (L1) and (L2), and wherein
  the layer (L1) contains from 25 to 95% by weight of aerogel and from 5 to 75% by weight of fibers and from 0 to 70% by weight of fillers,
  the layer (L2) contains from 25 to 95% by weight of aerogel and from 5 to 75% by weight of fibers and from 0 to 70% by weight of fillers, and
  the layer (LB) comprises at least one inorganic binder, has a density of less than 2700 kg/m$^3$ and optionally comprises pores.
45. Use of a composite according to embodiment 43 or embodiment 44 for thermal insulation.

Examples will be used below to illustrate the invention.

EXAMPLES

I. General Description 10 mm thick aerogel blankets measuring 15 cm×15 cm were bonded using foamed glue. After applying the foamed glue on one blanket, the another blanket is put on the top. The glued blankets were then pressed to 90% of their original thickness and dried in microwave oven (power 1000 W) for 15 min.

II. Preparation Examples

1. Example 1

0.5 gm of surfactant (Glucopon DK 225) and 4 gm Metakaolin (Argical® 1200 S) were added to 40 gm of potassium waterglass solution (VP 19621, IGP Dülmen GmbH). The foaming is done by stirring the above mix for 15 sec using a hand mixer. Spaceloaft A2 aerogel blanket from Aspen Aerogels were bonded using 6 gm of foamed glue using the described process.

The tensile strength increased from 3.6 kPa (without foam) to 7.8 kPa (with foam).

2. Example 2

The example was carried out as described in example 1 with the difference that before the application of adhesive, the dust was removed from the blanket surfaces using dust suction device.

The tensile strength increased from 3.6 kPa (without foam) to 8.3 kPa (with foam).

3. Example 3

The example was carried out as described in example 1 with the difference that a FMA450 aerogel blanket from Nano Tech was glued instead of Spaceloaft A2.

The tensile strength increased from 3.3 kPa (without foam) to 9.1 kPa (with foam).

4. Example 4

The example was carried out as described in example 3 with the difference that 3, 4 gm of foamed glue was used.

The tensile strength increased from 3.1 kPa (without foam) to 6.5 kPa (with foam).

5. Example 5

The example was carried out as described in example 2 with the difference that the glue was foamed without using Metakaolin in the composition.

The tensile strength increased from 3.6 kPa (without foam) to 4.3 kPa (with foam).

6. Example 6

The example was carried out as described in example 1 with the difference that the glue was foamed without using Metakaolin in the composition.

The tensile strength increased from 3.6 kPa (without foam) to 14.7 kPa (with foam).

7. Example 7

The example was carried out as described in example 6 with the difference that instead of VP 19621, K45M (from Woellner GmbH) waterglass was used.

The tensile strength increased from 3.6 kPa (without foam) to 5.7 kPa (with foam). Note that the adhesion strength (adhesion of blankets) was higher than 5.7 kPa as there was cohesive failure in blanket, while without foam it was an adhesive failure.

8. Example 8

The example was carried out as described in example 7 with the difference that instead of using hand mixture, the foaming is done by using the rotor stator mixer. The amount of different components were increased for big scale trial but the ratio of different componets were same as in example 7.

The tensile strength increased from 3.6 kPa (without foam) to 5.5 kPa (with foam). Note that the adhesion strength (adhesion of blankets) was higher than 5.5 kPa as there was cohesive failure in blanket, while without foam it was an adhesive failure (failure within glue).

9. Example 9

The example was carried out as described in example 2 with the difference that instead of VP 19621, K45M (from Woellner GmbH) waterglass was used.

The tensile strength increased to 6.8 kPa (with foam). Note that the adhesion strength (adhesion of blankets) was higher than 6.8 kPa as there was cohesive failure in blanket.

10. Example 10

The example was carried out as described in example 2 with the difference that the instead of potassium waterglass, sodium waterglass (Betol 57 from Woellner GmbH) was used.

The tensile strength increased to 6.1 kPa (with foam). Note that the adhesion strength (adhesion of blankets) was higher than 6.1 kPa as there was cohesive failure in blanket.

11. Example 11

The example was carried out as described in example 6 with the difference that instead of VP 19621, K42 (from Woellner GmbH) waterglass was used.

The tensile strength increased from 3.6 kPa (without foam) to 16.15 kPa (with foam).

12. Example 12

The example was carried out as described in example 6 with the difference that the instead of 0.5 g, 0.6 g surfactant was used.

The tensile strength increased from 3.6 kPa (without foam) to 16.3 kPa (with foam).

13. Example 13

The example was carried out as described in example 6 with the difference that the fibers from the blanket were partially pulled out surface using a brush.

The tensile strength increased from 3.6 kPa (without foam) to 13.35 kPa (with foam).

14. Example 14

The example was carried out as described in example 6 with the difference that that 12 g water was added in the mixture.

The tensile strength increased from 3.6 kPa (without foam) to 9.4 kPa (with foam).

The invention claimed is:
1. A process for the preparation of a composite comprising at least layers (L1), (L2) and a binder layer (LB) located between layers (L1) and (L2), the process comprising:
   (i) applying a foamed composition (C1) comprising an inorganic binder on one surface of the layer (L1) or layer (L2) or layer (L1) and (L2) to form the binder layer (LB),
   (ia) layer (L1) comprising from 25 to 95% by weight of aerogel and from 5 to 75% by weight of fibers and from 0 to 70% by weight of fillers, and

(ib) layer (L2) comprising from 25 to 95% by weight of aerogel and from 5 to 75% by weight of fibers and from 0 to 70% by weight of fillers; and (ii) combining the layer (L1) and the layer (L2) in a manner that the binder layer (LB) comprising the foamed composition (C1) is located between the layer (L1) and the layer (L2);

(iii) pressing to compress the binder layer (LB) between the layer (L1) and the layer (L2); and (iv) curing and/or drying the foamed composition (C1) in the binder layer (LB) between the layer (L1) and the layer (L2) to form the composite; and wherein the composite has a tensile strength that is greater than a tensile strength of a comparable laminate that is the same as the composite except made with an unfoamed composition.

2. The process according to claim 1, wherein the composite comprises further layers.

3. The process according to claim 1, further comprising: forming the foamed composition (C1) mechanically or physically.

4. The process according to claim 3, comprising: forming the foamed composition (C1) mechanically by stirring, ultrasonic foaming, by introducing mechanical energy or by blowing a gas through the composition.

5. The process according to claim 1, comprising: chemically forming the foamed composition (C1).

6. The process according to claim 5, wherein chemically forming is carried out with an agent which releases a suitable gas or by using a foaming agent.

7. The process according to claim 1, wherein the aerogel is at least one aerogel comprising silicon, aluminium and/or titanium.

8. The process according to claim 1, wherein the filler is an inorganic filler.

9. The process according to claim 1, wherein the filler is an inorganic filler selected from the group consisting of magnesium dioxide, titanium dioxide, titanium carbide, silicon carbide, iron(III) oxide, iron(II) oxide, zirconium silicate, zirconium oxide, tin oxide, manganese oxide, calcium silicate, calcium carbonate and a mixture thereof.

10. The process according to claim 1, wherein the fibers are selected from the group consisting of inorganic fibers and organic fibers.

11. The process according to claim 1, wherein the fibers are inorganic fibers selected from the group consisting of glass fibers, rock fibers, metal fibers, boron fibers, ceramic fibers, basalt fibers, and mixtures thereof.

12. The process according to claim 1, wherein the fibers are organic fibers selected from the group consisting of fibers based on polyethylene, polypropylene, polyacrylonitrile, polyamide, aramid and polyester.

13. The process according to claim 1, wherein the foamed composition (C1) comprises at least one further component selected from the group consisting of surfactants, organic and/or inorganic fibers, dispersions, infrared reflectors and/or absorbers, accelerators, retarders, thickeners, water retention agents, dispersants, rheology modifiers, antifoams, aerogel, pyrogenic silica, hollow spheres and fillers.

14. The process according to claim 1, wherein the foamed composition (C1) comprises at least one surfactant and/or Pickering stabilizers.

15. The process according to claim 1, wherein the surface on which the foamed composition (C1) is applied is treated before applying composition (C1).

16. The process according to claim 15, wherein the treatment is selected from the group consisting of plasma treatment of the surface, surface coating, removal of dust from the surface, and partially pulling out of embedded fibers from the surface.

17. The process according to claim 1, wherein the inorganic binder is at least one selected from the group consisting of alkali silicate, cement and alkali-activated aluminosilicates.

18. The process according to claim 1, wherein the binder layer (LB) has a thickness of from 0.05 to 0.4 cm before the pressing (iii).

19. The process according to claim 1, wherein the pressing (iii) compresses the binder layer (LB) to a thickness that is about 50%-95% of a thickness of the binder layer (LB) before the pressing (iii).

20. The process according to claim 1, wherein the combining forms combined layers having an initial thickness and the pressing and curing forms a composite having a thickness that is 90% or less of the initial thickness.

21. A composite, comprising at least layers (L1) and (L2) and layer (LB), wherein the composite is obtained by a process according to claim 1.

22. A process, comprising applying a composite according to claim 21 for thermal insulation.

* * * * *